(12) United States Patent
Li

(10) Patent No.: US 8,923,262 B2
(45) Date of Patent: Dec. 30, 2014

(54) ELECTRONIC DEVICE AND METHOD FOR LOCATING WIFI DEVICES ADJACENT TO THE ELECTRONIC DEVICE

(71) Applicants: Shenzhen Futaihong Precision Industry Co., Ltd., Shenzhen (CN); Chi Mei Communication Systems, Inc., New Taipei (TW)

(72) Inventor: Qiang Li, Shenzhen (CN)

(73) Assignees: Shenzhen Futaihong Precision Industry Co., Ltd., Shenzhen (CN); Chi Mei Communication Systems, Inc., New Taipei (TW)

(\*) Notice: Subject to any disclaimer, the term of this patent is extended or adjusted under 35 U.S.C. 154(b) by 109 days.

(21) Appl. No.: 13/753,549

(22) Filed: Jan. 30, 2013

(65) Prior Publication Data
US 2013/0258881 A1 Oct. 3, 2013

(30) Foreign Application Priority Data
Apr. 2, 2012 (CN) .......................... 2012 1 0095515

(51) Int. Cl.
| | | |
|---|---|---|
| H04W 4/00 | (2009.01) | |
| H04W 24/00 | (2009.01) | |
| G01S 5/02 | (2010.01) | |
| G01S 5/14 | (2006.01) | |
| G01S 11/02 | (2010.01) | |
| H04W 8/00 | (2009.01) | |
| H04W 48/16 | (2009.01) | |

(52) U.S. Cl.
CPC .............. *H04W 24/00* (2013.01); *G01S 5/0242* (2013.01); *G01S 5/14* (2013.01); *G01S 11/026* (2013.01); *H04W 8/005* (2013.01); *H04W 48/16* (2013.01)
USPC ............ 370/338; 370/401; 370/329; 455/446

(58) Field of Classification Search
None
See application file for complete search history.

(56) References Cited

U.S. PATENT DOCUMENTS

| | | | |
|---|---|---|---|
| 2006/0089964 A1* | 4/2006 | Pandey et al. ................. | 709/203 |
| 2011/0279244 A1* | 11/2011 | Park et al. .................. | 340/10.34 |
| 2013/0086665 A1* | 4/2013 | Filippi et al. ...................... | 726/7 |
| 2013/0194428 A1* | 8/2013 | Chao et al. ..................... | 348/159 |

* cited by examiner

*Primary Examiner* — Bob Phunkulh
(74) *Attorney, Agent, or Firm* — Novak Druce Connolly Bove + Quigg LLP

(57) ABSTRACT

In a method for locating WIFI devices adjacent to an electronic device, one or more WIFI devices adjacent to the electronic device are searched for within a signal strength range of the electronic device. The method establishes an X-Y coordinate system based on a horizontal line and an initial position of the electronic device, and calculates coordinate values of each of the
WIFI devices based on the X-Y coordinate system according to a moving distance of the electronic device and a relative distance between the electronic device and each of the WIFI devices. The method further draws a distribution map of the WIFI devices according to the coordinate value of each of the WIFI devices, and displays the distribution map indicating the location of each of the WIFI devices on a display screen of the electronic device.

18 Claims, 5 Drawing Sheets

ELECTRONIC DEVICE AND METHOD FOR LOCATING WIFI DEVICES ADJACENT TO THE ELECTRONIC DEVICE

BACKGROUND

1. Technical Field

Embodiments of the present disclosure relate to device positioning systems and methods, and particularly to a electronic device and a method for locating WIFI devices adjacent to the electronic device.

2. Description of Related Art

In WIFI networks, an electronic device can communicate wirelessly with one or more communication devices, such as WIFI devices. The devices may be a laptop computer, a handheld computer, a mobile telephone, a PDA device, or any electronic device that is capable of connecting wirelessly to a WIFI network. The WIFI network typically has an indoor signal range of one hundred to three hundred feet, and the signal strength of the indoor WIFI network degrades as the distance increases. Also, an outdoor signal range for the outdoor WIFI network is approximately one thousand feet, and the signal strength of the outdoor WIFI network also degrades as the distance increases. One problem associated with access to the WIFI network is that it is sometimes difficult for a user of the electronic device to locate WIFI devices in a geographic location near to the electronic device.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean "at least one."

In the present disclosure, the word "module," as used herein, refers to logic embodied in hardware or firmware, or to a collection of software instructions, written in a program language. In one embodiment, the program language may be Java, C, or assembly. One or more software instructions in the modules may be embedded in firmware, such as in an EPROM. The modules described herein may be implemented as either software and/or hardware modules and may be stored in any type of non-transitory computer-readable medium or other storage system. Some non-limiting examples of a non-transitory computer-readable medium include CDs, DVDs, flash memory, and hard disk drives.

Figure 1:
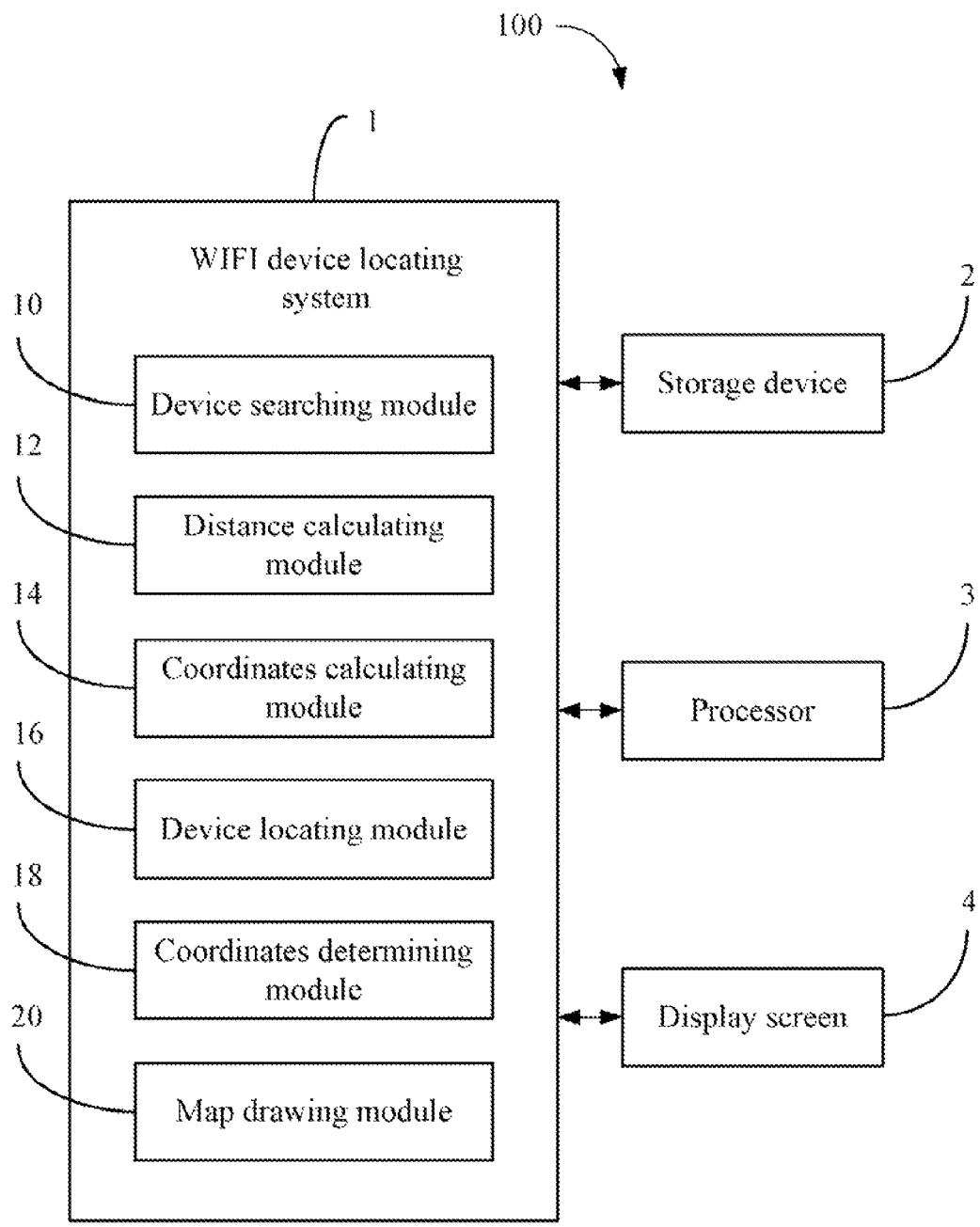
FIG. 1 is a block diagram of one embodiment of an electronic device including a WIFI device locating system.

FIG. 1 is a block diagram of one embodiment of an electronic device 100 including a WIFI device locating system 1. In the embodiment, the electronic device 100 may further include a storage device 2, at least one processor 3, and a display screen 4. The electronic device 100 may be a laptop computer, a handheld computer, a mobile telephone, a PDA device, or any electronic device that is capable of connecting wirelessly to a WIFI network. In the embodiment, the WIFI device locating system 1 may include computerized instructions in the form of one or more programs that are stored in the storage device 2 and executed by the at least one processor 3. It should be understood that FIG. 1 illustrates only one example of the electronic device 100 that may include more or fewer components than illustrated, or have a different configuration of the various components in other embodiments.

Figure 5:
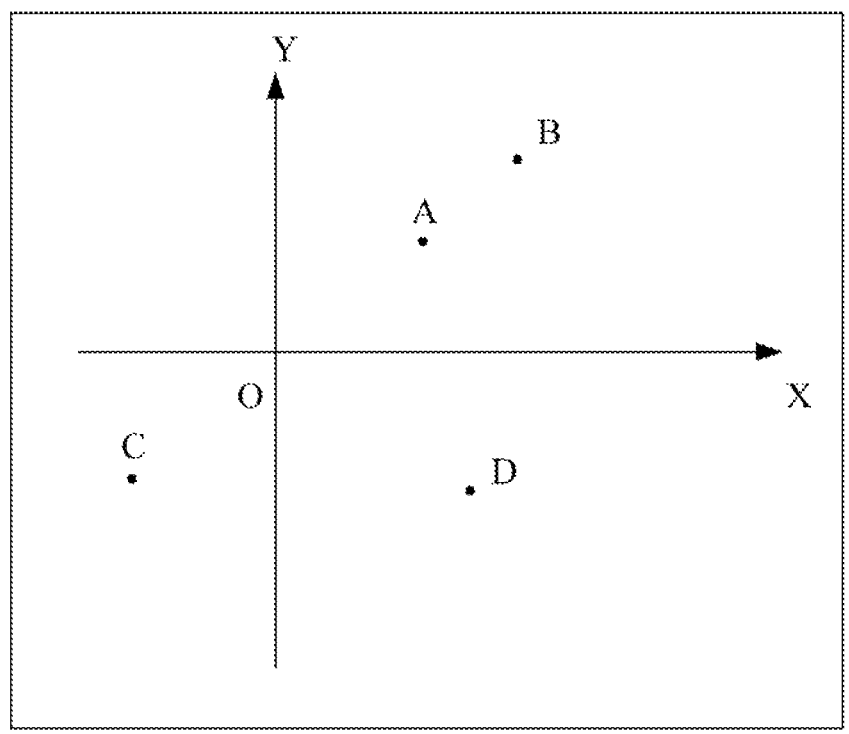
FIG. 5 is a schematic diagram illustrating a distribution map including the WIFI devices adjacent to the electronic device.

The WIFI device locating system 1 searches for one or more WIFI devices (e.g., the WIFI devices "A," "B," "C," and "D" as shown in FIG. 5) adjacent to the electronic device 100, and calculates a coordinate value of each of the WIFI devices according to a signal strength of WIFI signals transmitted from the WIFI devices, and draws a distribution map of the WIFI devices according to the coordinate value of each of the WIFI devices. In the embodiment, each of the WIFI devices may be a laptop computer, a handheld computer, a mobile telephone, a PDA device, or any electronic device that is capable of connecting wirelessly to a WIFI network.

In one embodiment, the storage device 2 may be an internal storage system, such as a random access memory (RAM) for temporary storage of information, and/or a read only memory (ROM) for permanent storage of information. In some embodiments, the storage device 2 may also be an external storage system, such as an external hard disk, a storage card, or a data storage medium. The display screen 4 displays the distribution map of the WIFI devices drawn by the WIFI device locating system 1.

In one embodiment, the WIFI device locating system 1 includes a device searching module 10, a distance calculating module 12, a coordinates calculating module 14, a device locating module 16, a coordinates determining module 18, and a map drawing module 20. The modules 10-20 may comprise computerized instructions in the form of one or more programs that are stored in the storage device 2 and executed by the at least one processor 3. A description of each module 10-20 appears in FIG. 3 and is described in the following paragraphs.

Figure 2:
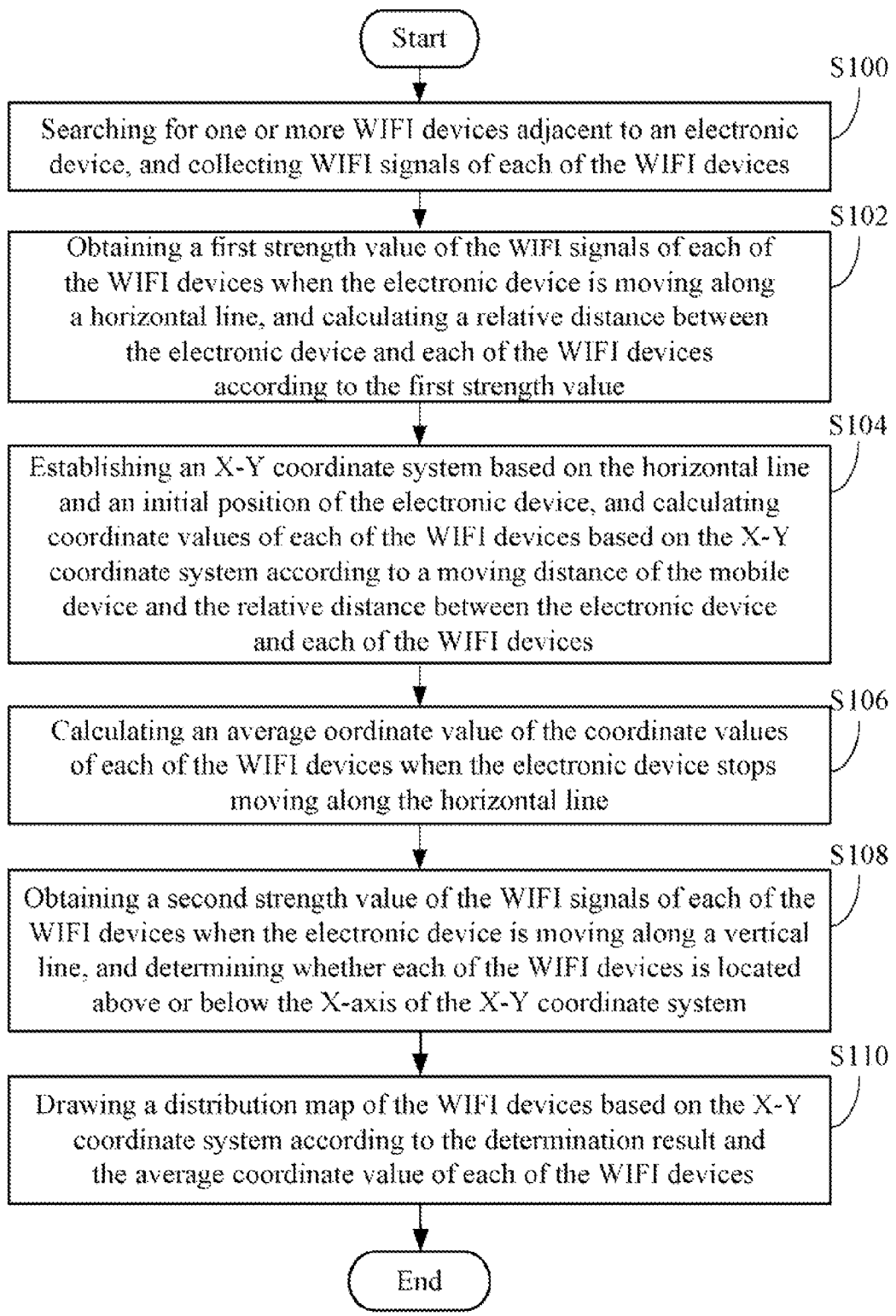
FIG. 2 is a flowchart of one embodiment of a method for locating WIFI devices adjacent to the electronic device of FIG. 1.

FIG. 2 is a flowchart of one embodiment of a method for locating WIFI devices adjacent to the electronic device 100 of FIG. 1. Depending on the embodiment, additional steps may be added, others removed, and the ordering of the steps may be changed.

In step S100, the device searching module 10 searches for one or more WIFI devices adjacent to the electronic device 100, and collects WIFI signals transmitted from each of the WIFI devices. In one embodiment, the device searching module 10 further obtains a device name of each of the WIFI devices and signal strengths of the WIFI signals of each of the WIFI devices, and creates a device information list to store the device name of each of the WIFI devices and the respective signal strengths of the WIFI signals of each of the WIFI devices. The device information list is stored in the storage device 2 of the electronic device 100.

In step S102, the distance calculating module 12 obtains a first signal strength of the WIFI signals of each of the WIFI devices and records a moving distance of the electronic device 100 when the electronic device 100 is moving along a horizontal line, and calculates a relative distance between the electronic device 100 and each of the WIFI devices according to the first signal strength of the WIFI signals of each of the WIFI devices. In the embodiment, the distance calculating module 12 calculates the relative distance by performing a calculation formula as follows: L=a*F(x), wherein L represents the relative distance, a is a predetermined number factor, and F(x) represents a signal strength function of the WIFI signals transmitted from the WIFI devices.

In the embodiment, the number factor a is obtained by performing the following steps: (1). obtaining a first signal strength of the WIFI signals transmitted from each of the WIFI devices when the electronic device 100 moves a first predetermined distance (e.g., L=5 meters); (2). performing the calculation formula L=a*F(x) to calculate a first number factor a1; (3). predefining a second predetermined distance (e.g., L=10 meters) and repeating step (1) and step (2) to calculate a second number factor a2; and (4). calculating an average value of the first number factor a1 and the second number factor a2 to obtain the number factor.

Figure 3:
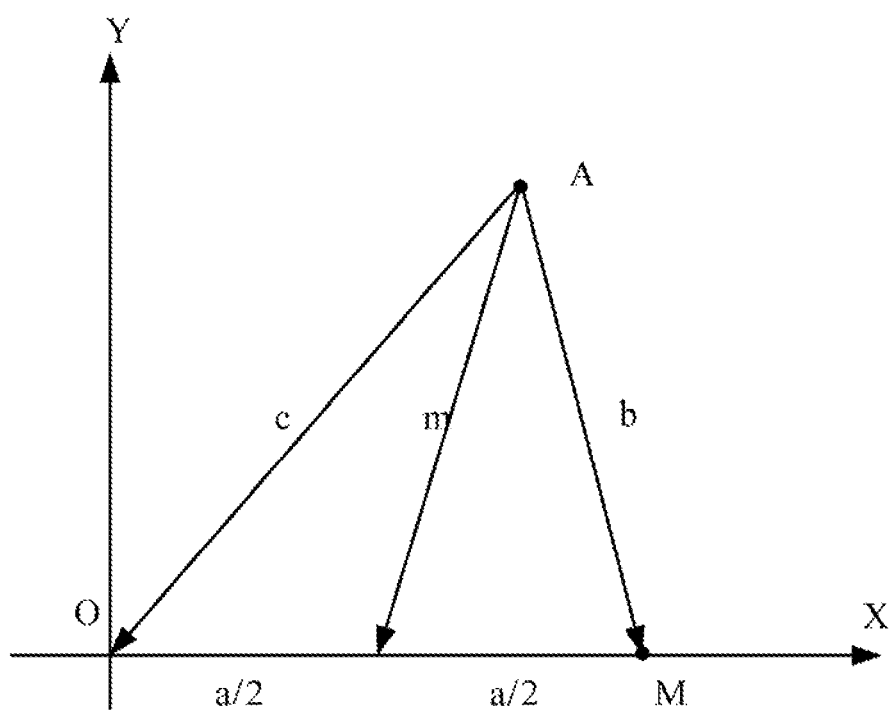
FIG. 3 is a schematic diagram illustrating an X-Y coordinates system based on an initial position of the electronic device.

In step S104, the coordinates calculating module 14 establishes an X-Y coordinate system based on the horizontal line and an initial position of the electronic device 100, and calculates coordinate values of each of the WIFI devices based on the X-Y coordinate system according to the moving distance of the electronic device and the relative distance between the electronic device and each of the WIFI devices. Referring to FIG. 3, the X-Y coordinate system is established based on the initial position "O" of the electronic device 100, and contains an X-axis and a Y-axis. The X-axis is the horizontal line, and the Y-axis is the vertical line. The distance "c" represents the relative distance between the electronic device 100 and a WIFI device "A" when the electronic device 1 locates in initial position "O". The distance "m" represents the relative distance between the electronic device 100 and the WIFI device "A" when the electronic device 1 moves the distance M/2 along the horizontal line. The distance "b" represents the relative distance between the electronic device 100 and the WIFI device "A" when the electronic device 1 moves the distance M along the horizontal line.

Figure 4:
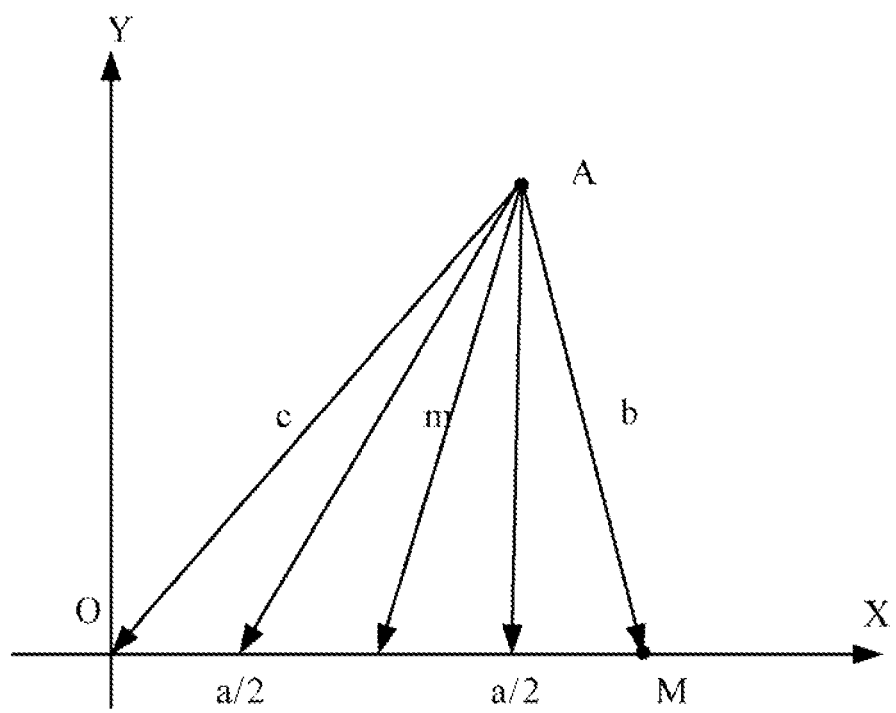
FIG. 4 is a schematic diagram illustrating calculation of coordinates of a WIFI device searched for by the electronic device.

In step S106, the device locating module 16 calculates an average coordinate value of the coordinate values of each of the WIFI devices when the electronic device 100 stops moving in the horizontal line. In the embodiment, the average coordinate value consists of an X-coordinate value and a Y-coordinate value, and each of which has a positive value or a negative value, such as (+X, +Y), (−X, +Y), (−X, −Y) and (+X, −Y). Referring to FIG. 4, the average coordinate value of the WIFI device "A" is represented by (+X, +Y).

In step S108, the coordinates determining module 18 obtains a second signal strength of the WIFI signals of each of the WIFI devices when the electronic device 100 is moving along the vertical line, and determines whether each of the WIFI devices is located above or below the X-axis of the X-Y coordinate system according to the average coordinate value of the WIFI devices. Referring to FIG. 4, the average coordinate value of the WIFI device "A" is (+X, +Y), namely, the WIFI device "A" is located above the X-axis of the X-Y coordinate system.

In one embodiment, if the signal strength of a WIFI device upgrades when the electronic device 100 is moving towards a positive direction of the Y-axis of the X-Y coordinate system, the coordinates determining module 18 determines that the WIFI device is located above the X-axis of the X-Y coordinate system and determines that the average Y-coordinate value of the WIFI device is a positive value. If the signal strength of the WIFI device degrades when the electronic device 100 is moving towards the positive direction of the Y-axis of the X-Y coordinate system, the coordinates determining module 18 determines that the WIFI device is located below the X-axis of the X-Y coordinate system and determines that the average Y-coordinate value of the WIFI device is a negative value.

In the embodiment, if the signal strength of the WIFI device upgrades when the electronic device 100 is moving towards a negative direction of the Y-axis of the X-Y coordinate system, the coordinates determining module 18 determines that the WIFI device is located below the X-axis of the X-Y coordinate system and determines that the average Y-coordinate value of the WIFI device is a negative value. If the signal strength of the WIFI device degrades when the electronic device 100 is moving towards the negative direction of the Y-axis of the X-Y coordinate system, the coordinates determining module 18 determines that the WIFI device is located above the X-axis of the X-Y coordinate system and determines that the average Y-coordinate value of the WIFI device is a positive value.

In step S110, the map drawing module 20 draws a distribution map of the WIFI devices adjacent to the electronic device 100 based on the X-Y coordinate system according to results of the determinations and the average coordinate value of each of the WIFI devices, and displays the distribution map indicating the location of each of the WIFI devices on the display screen 4 of the electronic device 100. Referring to FIG. 5, the distribution map includes the location of each of the WIFI devices "A," "B," "C," and "D," and all of these WIFI devices have been discovered by the electronic device 100 and can be connected to the electronic device 100 through the WIFI networks.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A method of an electronic device for locating WIFI devices adjacent to the electronic device, the method comprising:

searching for one or more WIFI devices adjacent to the electronic device, and collecting WIFI signals transmitted from each of the WIFI devices;

obtaining a first signal strength of the WIFI signals of each of the WIFI devices and recording a moving distance of the electronic device when the electronic device is moving along a horizontal line, and calculating a relative distance between the electronic device and each of the WIFI devices according to the first signal strength of the WIFI signals transmitted from each of the WIFI devices;

establishing an X-Y coordinate system based on the horizontal line and an initial position of the electronic device, and calculating coordinate values of each of the WIFI devices based on the X-Y coordinate system according to the moving distance and the relative distance between the electronic device and each of the WIFI devices;

calculating an average coordinate value of the coordinate values of each of the WIFI devices when the electronic device stops moving along the horizontal line;

obtaining a second signal strength of the WIFI signals of each of the WIFI devices when the electronic device is moving along the vertical line, and determining whether each of the WIFI devices is located above or below the X-axis of the X-Y coordinate system according to the average coordinate value of each of the WIFI devices; and drawing a distribution map of the WIFI devices adjacent to the electronic device based on the X-Y coordinate system according to the determination result and the average coordinate value of each of the WIFI devices.

2. The method according to claim 1, further comprising:
obtaining a device name of each of the WIFI devices and signal strengths of the WIFI signals of each of the WIFI devices; and
creating a device information list to store the device name of each of the WIFI devices and the signal strengths of the WIFI signals of each of the WIFI devices.

3. The method according to claim 1, wherein the relative distance is calculated by performing a calculation formula as follows: L=a*F(x), where L represents the relative distance, a is a predetermined number factor, and F(x) represents a signal strength function of the WIFI signals transmitted from the WIFI devices.

4. The method according to claim 1, wherein when the electronic device is moving towards a positive direction of the Y-axis of the X-Y coordinate system, the determination result comprises:
determining that a WIFI device is located above the X-axis of the X-Y coordinate system and determining that the average Y-coordinate value of the WIFI device is a positive value, if the signal strength of the WIFI device upgrades; and
determining that the WIFI device is located below the X-axis of the X-Y coordinate system and determining that the average Y-coordinate value of the WIFI device is a negative value, if the signal strength of the WIFI device degrades.

5. The method according to claim 1, wherein when the electronic device is moving towards a negative direction of the Y-axis of the X-Y coordinate system, the determination result comprises:
determining that a WIFI device is located below the X-axis of the X-Y coordinate system and determining that the average Y-coordinate value of the WIFI device is a negative value, if the signal strength of the WIFI device upgrades; and
determining that the WIFI device is located above the X-axis of the X-Y coordinate system and determining that the average Y-coordinate value of the WIFI device is a positive value, if the signal strength of the WIFI device degrades.

6. The method according to claim 1, wherein the electronic device is selected from the group consisting of a laptop computer, a handheld computer, a mobile telephone, and a PDA device.

7. An electronic device, comprising:
a storage device;
at least one processor; and
one or more programs stored in the storage device and executed by the at least one processor, the one or more programs comprising:
a device searching module that searches for one or more WIFI devices adjacent to the electronic device, and collects WIFI signals transmitted from each of the WIFI devices;
a distance calculating module that obtains a first signal strength of the WIFI signals of each of the WIFI devices and records a moving distance of the electronic device when the electronic device is moving along a horizontal line, and calculates a relative distance between the electronic device and each of the WIFI devices according to the first signal strength of the WIFI signals transmitted from each of the WIFI devices;
a coordinates calculating module that establishes an X-Y coordinate system based on the horizontal line and an initial position of the electronic device, and calculates coordinate values of each of the WIFI devices based on the X-Y coordinate system according to the moving distance and the relative distance between the electronic device and each of the WIFI devices;
a device locating module that calculates an average coordinate value of the coordinate values of each of the WIFI devices when the electronic device stops moving in the horizontal line;
a coordinates determining module that obtains a second signal strength of the WIFI signals of each of the WIFI devices when the electronic device is moving along the vertical line, and determines whether each of the WIFI devices is located above or below the X-axis of the X-Y coordinate system according to the average coordinate value of the WIFI devices; and
a map drawing module that draws a distribution map of the WIFI devices adjacent to the electronic device based on the X-Y coordinate system according to the determination result and the average coordinate value each of the WIFI devices.

8. The electronic device according to claim 7, wherein the device searching module further obtains a device name of each of the WIFI devices and signal strengths of the WIFI signals of each of the WIFI devices, and creates a device information list to store the device name of each of the WIFI devices and the signal strengths of the WIFI signals of each of the WIFI devices.

9. The electronic device according to claim 7, wherein the distance calculating module calculates the relative distance the electronic device and each of the WIFI devices by performing a calculation formula as follows: L=a*F(x), where L represents the relative distance, a is a predetermined number factor, and F(x) represents a signal strength function of the WIFI signals transmitted from the WIFI devices.

10. The electronic device according to claim 7, wherein when the electronic device is moving towards a positive direction of the Y-axis of the X-Y coordinate system, the determination result comprises:
determining that a WIFI device is located above the X-axis of the X-Y coordinate system and determining that the average Y-coordinate value of the WIFI device is a positive value, if the signal strength of the WIFI device upgrades; and
determining that the WIFI device is located below the X-axis of the X-Y coordinate system and determining that the average Y-coordinate value of the WIFI device is a negative value, if the signal strength of the WIFI device degrades.

11. The electronic device according to claim 7, wherein when the electronic device is moving towards a negative direction of the Y-axis of the X-Y coordinate system, the determination result comprises:
determining that a WIFI device is located below the X-axis of the X-Y coordinate system and determining that the average Y-coordinate value of the WIFI device is a negative value, if the signal strength of the WIFI device upgrades; and
determining that the WIFI device is located above the X-axis of the X-Y coordinate system and determining that the average Y-coordinate value of the WIFI device is a positive value, if the signal strength of the WIFI device degrades.

12. The electronic device according to claim 7, wherein the electronic device is selected from the group consisting of a laptop computer, a handheld computer, a mobile telephone, a PDA device, and an electronic device.

13. A non-transitory storage medium having stored thereon instructions that, when executed by at least one processor of a electronic device, causes the electronic device to perform a method for locating WIFI devices adjacent to the electronic device, the method comprising:

searching for one or more WIFI devices adjacent to the electronic device, and collecting WIFI signals transmitted from each of the WIFI devices;

obtaining a first signal strength of the WIFI signals of each of the WIFI devices and recording a moving distance of the electronic device when the electronic device is moving along a horizontal line, and calculating a relative distance between the electronic device and each of the WIFI devices according to the first signal strength of the WIFI signals transmitted from each of the WIFI devices;

establishing an X-Y coordinate system based on the horizontal line and an initial position of the electronic device, and calculating coordinate values of each of the WIFI devices based on the X-Y coordinate system according to the moving distance and the relative distance between the electronic device and each of the WIFI devices;

calculating an average coordinate value of the coordinate values of each of the WIFI devices when the electronic device stops moving in the horizontal line;

obtaining a second signal strength of the WIFI signals of each of the WIFI devices when the electronic device is moving along the vertical line, and determining whether each of the WIFI devices is located above or below the X-axis of the X-Y coordinate system according to the average coordinate value of each of the WIFI devices; and drawing a distribution map of the WIFI devices adjacent to the electronic device based on the X-Y coordinate system according to the determination result and the average coordinate value each of the WIFI devices.

14. The storage medium according to claim 13, wherein the method further comprises:

obtaining a device name of each of the WIFI devices and signal strengths of the WIFI signals of each of the WIFI devices; and creating a device information list to store the device name of each of the WIFI devices and the signal strengths of the WIFI signals of each of the WIFI devices.

15. The storage medium according to claim 13, wherein the relative distance is calculated by performing a calculation formula as follows: $L=a*F(x)$, where L represents the relative distance, a is a predetermined number factor, and $F(x)$ represents a signal strength function of the WIFI signals transmitted from the WIFI devices.

16. The storage medium according to claim 13, wherein when the electronic device is moving towards a positive direction of the Y-axis of the X-Y coordinate system, the determination result comprises:

determining that a WIFI device is located above the X-axis of the X-Y coordinate system and determining that the average Y-coordinate value of the WIFI device is a positive value, if the signal strength of the WIFI device upgrades; and determining that the WIFI device is located below the X-axis of the X-Y coordinate system and determining that the average Y-coordinate value of the WIFI device is a negative value, if the signal strength of the WIFI device degrades.

17. The storage medium according to claim 13, wherein when the electronic device is moving towards a negative direction of the Y-axis of the X-Y coordinate system, the determination result comprises:

determining that a WIFI device is located below the X-axis of the X-Y coordinate system and determining that the average Y-coordinate value of the WIFI device is a negative value, if the signal strength of the WIFI device upgrades; and determining that the WIFI device is located above the X-axis of the X-Y coordinate system and determining that the average Y-coordinate value of the WIFI device is a positive value, if the signal strength of the WIFI device degrades.

18. The storage medium according to claim 13, wherein the electronic device is selected from the group consisting of a laptop computer, a handheld computer, a mobile telephone, a PDA device, and an electronic device.

* * * * *